Aug. 3, 1965 F. L. PUTZRATH 3,199,014

MINIMUM ERROR DETECTING CIRCUIT

Filed May 19, 1961

INVENTOR.
FRANZ L. PUTZRATH

BY Wade Koontz
ATTORNEY and
James S. Shannon
AGENT

United States Patent Office 3,199,014
Patented Aug. 3, 1965

3,199,014

MINIMUM ERROR DETECTING CIRCUIT

Franz L. Putzrath, Oaklyn, N.J., assignor to the United States of America as represented by the Secretary of the Air Force Filed May 19, 1961, Ser. No. 111,410
1 Claim. (Cl. 320—1)

In pattern matching systems such as character recognizers, for example, it is necessary to compare the incoming message with the available store of standard patterns. In many applications this is accomplished in a serial mode so that an error signal is produced the instantaneous voltage of which is proportional to the degree of error between the unknown pattern and the stored pattern. It then becomes necessary to determine when the error signal reaches a minimum value. The purpose of this invention is to provide a circuit for determining when an error signal or, more generally, any complex voltage wave reaches a minimum value.

Figure 1:
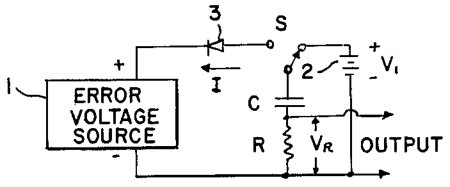
Figure 2:
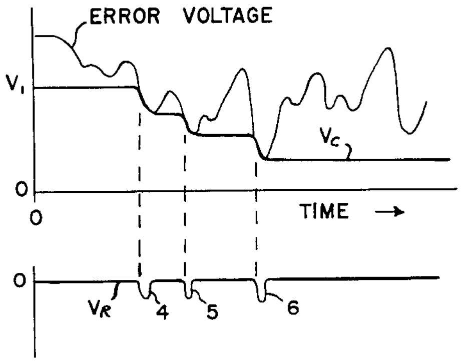

The manner in which the above purpose is accomplished will be explained in detail with reference to the accompanying drawing in which FIG. 1 is a schematic diagram of the minimum error detecting circuit, and FIG. 2 illustrates the operation of the circuit of FIG. 1.

Referring to FIG. 1, error voltage source 1 may be a pattern matching system as mentioned above which produces an error voltage the instantaneous value of which is proportional to the error between patterns to be matched. The circuit of FIG. 1 determines when the error voltage has its minimum value, i.e., when the closest match occurs. A typical error voltage variation as a function of time is shown in FIG. 2. The circuit comprises a condenser C and an output transistor R connected in series and a single pole double throw switching device S for connecting the series elements either across direct current source 2 or through unidirectional device 3 to error voltage source 1. The circuit is initially conditioned by throwing switch S to the right to initially charge condenser C to the voltage $V_1$. The switch is then thrown to the left to determine when the minimum error signal occurs. The output voltage giving this information is developed across resistor R.

The operation of the circuit is illustrated in FIG. 2. Consider switch S to be in its right hand position, as illustrated, and condenser C to be charged as a result to the voltage $V_1$ of source 2. At time $t=0$ switch S is thrown to its left hand or operating position. It will be apparent from FIG. 1 that, in the operating position, source 1, resistor R, charged condenser C and diode 3 are all connected in a series circuit and that current flow in this circuit is limited to the discharge direction by unidirectional device 3. At time $t=0$ the condenser voltage $V_c=V_1$ and the error voltage is greater than $V_c$. Therefore no current flow occurs in resistor R due to the opposition of diode 3. However, when the error voltage falls below $V_c$ condenser C discharges through diode 3, source 1 and resistor R with $V_c$ falling from $V_1$ to substantial equality with the error voltage. This discharge produces a negative voltage pulse 4 across R and establishes a new lower value for $V_c$. No further discharge occurs until the error voltage falls below the newly established value of $V_c$ at which time the condenser discharges further producing another output pulse 5 and establishing another new lower value of $V_c$. This process continues with an output pulse being produced each time the error signal falls below the last established value of $V_c$. It is evident that the last pulse in this series, such as pulse 6 in FIG. 2, occurs at the time when the error signal passes through its minimum value.

Although the error signal is usually unipolar, as shown in the example given, this is not a requirement of the circuit. If the error signal should pass through zero and become negative the circuit would still operate satisfactorily provided, of course, that the maximum negative peak is to be taken as the minimum value of the signal. When the error signal becomes negative, condenser C charges through R, with its lower terminal positive, to a voltage equal to the negative peak, this process producing a negative pulse across R as before. Pulses will continue to be produced for any negative peak exceeding the last established negative condenser voltage. The last output pulse to occur therefore establishes when the signal passed through its maximum negative peak.

For proper operation of the circuit, the quality of condenser C should be such that no significant leakage of charge occurs during an operating period of the circuit.

I claim:

A circuit for detecting when the minimum value of a unipolar signal occurs, said circuit comprising: a condenser, a resistor and a unidirectional device; means operative to first charge said condenser to a predetermined voltage greater than the expected minimum value of said signal and then to form a circuit containing, to the exclusion of all other elements connected in or thereto, said signal, said unidirectional device, said charged condenser and said resistor connected in series in a closed loop, with the polarities of said charged condenser and said signal in opposition and with said unidirectional device poled for conduction in the condenser discharging direction; and an output circuit coupled across said resistor whereby an output voltage proportional to the discharge current of said condenser is produced in said output circuit.

References Cited by the Examiner

UNITED STATES PATENTS

| | | | |
|---|---|---|---|
| 2,439,224 | 4/48 | Koch | 320—1 X |
| 2,858,433 | 10/58 | Rector | 320—1 |
| 2,924,769 | 2/60 | Harriman et al. | 324—111 X |
| 2,927,224 | 3/60 | Ruehlemann | 307—109 |
| 2,961,537 | 11/60 | Turner | 320—1 |

FOREIGN PATENTS 873,104 4/53 Germany.

OTHER REFERENCES 1958 and 1964, Angelo, Electronic Circuits, published by McGraw-Hill Co. Inc.

1959, Zimmermann et al., Electronic Circuit Theory, published by John Wiley & Sons Inc.

IRVING L. SRAGOW, *Primary Examiner.*

MILTON C. HIRSHFIELD, *Examiner.*